United States Patent [19]

Dodd et al.

[11] Patent Number: 5,939,858
[45] Date of Patent: Aug. 17, 1999

[54] BATTERY CHARGER BOX

[76] Inventors: Michael Dodd, P.O. Box 231, New Market, Ala. 35761; David Cassidy, 971 Moontown Rd., Brownsboro, Ala. 35741

[21] Appl. No.: 09/150,587
[22] Filed: Sep. 10, 1998
[51] Int. Cl.$^6$ .................................................... H02J 7/00
[52] U.S. Cl. ......................... 320/107; 180/68.5; 429/96; D13/107
[58] Field of Search ........................... 320/107; 180/68.5; 429/96, 97, 98, 99, 100; D13/5, 7, 107, 108

[56] References Cited

U.S. PATENT DOCUMENTS

| D. 311,897 | 11/1990 | Moore et al. | D13/107 |
|---|---|---|---|
| 1,075,556 | 6/1913 | Fenoughty | 429/99 |
| 2,978,596 | 4/1961 | Robirds | 307/151 |
| 3,940,009 | 2/1976 | Szeles | 220/564 |
| 4,160,857 | 7/1979 | Nardella et al. | 429/97 |
| 5,293,951 | 3/1994 | Scott | 180/68.5 |

*Primary Examiner*—Peter S. Wong
*Assistant Examiner*—Gregory J. Toatley, Jr.

[57] ABSTRACT

A battery charger box for holding a pair of generally rectangular battery chargers therein. The box includes a container with a bottom panel and a perimeter side wall upwardly extending around the bottom panel of the container. A lid substantially covers a top opening into the container and is pivotally coupled to the perimeter side wall. The perimeter side wall has a generally oblong cord spool outwardly extending therefrom. The cord spool has an input receptacle for receiving an end of an electrical cord connected to a power supply. A pair of output receptacles are provided in the interior of the container and are electrically connected to the input receptacle for electrically connecting a pair of battery chargers in the container to the power supply. The perimeter side wall has a plurality of notches adjacent the upper edge of the perimeter side wall for extending the connecting cables of a battery charger in the interior space of the container therethrough.

10 Claims, 2 Drawing Sheets

BATTERY CHARGER BOX

BACKGROUND OF THE INVENTION

1. Field of the Invention

The present invention relates to containers for holding battery chargers therein and more particularly pertains to a new battery charger box for holding a pair of generally rectangular battery chargers therein.

2. Description of the Prior Art

The use of containers for holding battery chargers therein is known in the prior art. More specifically, containers for holding battery chargers therein heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 4,160,857; U.S. Pat. No. 5,293,951; U.S. Pat. No. Des. 311,897; U.S. Pat. No. 2,978,596; U.S. Pat. No. 3,940,009; and U.S. Pat. No. 1,075,556.

While these devices fulfill their respective, particular objectives and requirements, the aforementioned patents do not disclose a new battery charger box. The inventive device includes a container with a bottom panel and a perimeter side wall upwardly extending around the bottom panel of the container. A lid substantially covers a top opening into the container and is pivotally coupled to the perimeter side wall. The perimeter side wall has a generally oblong cord spool outwardly extending therefrom. The cord spool has an input receptacle for receiving an end of an electrical cord connected to a power supply. A pair of output receptacles are provided in the interior of the container and are electrically connected to the input receptacle for electrically connecting a pair of battery chargers in the container to the power supply. The perimeter side wall has a plurality of notches adjacent the upper edge of the perimeter side wall for extending the connecting cables of a battery charger in the interior space of the container therethrough.

In these respects, the battery charger box according to the present invention substantially departs from the conventional concepts and designs of the prior art, and in so doing provides an apparatus primarily developed for the purpose of holding a pair of generally rectangular battery chargers therein.

SUMMARY OF THE INVENTION

In view of the foregoing disadvantages inherent in the known types of containers for holding battery chargers therein now present in the prior art, the present invention provides a new battery charger box construction wherein the same can be utilized for holding a pair of generally rectangular battery chargers therein.

The general purpose of the present invention, which will be described subsequently in greater detail, is to provide a new battery charger box apparatus and method which has many of the advantages of the containers for holding battery chargers therein mentioned heretofore and many novel features that result in a new battery charger box which is not anticipated, rendered obvious, suggested, or even implied by any of the prior art containers for holding battery chargers therein, either alone or in any combination thereof.

To attain this, the present invention generally comprises a container with a bottom panel and a perimeter side wall upwardly extending around the bottom panel of the container. A lid substantially covers a top opening into the container and is pivotally coupled to the perimeter side wall. The perimeter side wall has a generally oblong cord spool outwardly extending therefrom. The cord spool has an input receptacle for receiving an end of an electrical cord connected to a power supply. A pair of output receptacles are provided in the interior of the container and are electrically connected to the input receptacle for electrically connecting a pair of battery chargers in the container to the power supply. The perimeter side wall has a plurality of notches adjacent the upper edge of the perimeter side wall for extending the connecting cables of a battery charger in the interior space of the container therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new battery charger box apparatus and method which has many of the advantages of the containers for holding battery chargers therein mentioned heretofore and many novel features that result in a new battery charger box which is not anticipated, rendered obvious, suggested, or even implied by any of the prior art containers for holding battery chargers therein, either alone or in any combination thereof.

It is another object of the present invention to provide a new battery charger box which may be easily and efficiently manufactured and marketed.

It is a further object of the present invention to provide a new battery charger box which is of a durable and reliable construction.

An even further object of the present invention is to provide a new battery charger box which is susceptible of a low cost of manufacture with regard to both materials and labor, and which accordingly is then susceptible of low prices of sale to the consuming public, thereby making such battery charger box economically available to the buying public.

Still yet another object of the present invention is to provide a new battery charger box which provides in the apparatuses and methods of the prior art some of the advantages thereof, while simultaneously overcoming some of the disadvantages normally associated therewith.

Still another object of the present invention is to provide a new battery charger box for holding a pair of generally rectangular battery chargers therein.

Yet another object of the present invention is to provide a new battery charger box which includes a container with a bottom panel and a perimeter side wall upwardly extending around the bottom panel of the container. A lid substantially covers a top opening into the container and is pivotally coupled to the perimeter side wall. The perimeter side wall has a generally oblong cord spool outwardly extending therefrom. The cord spool has an input receptacle for receiving an end of an electrical cord connected to a power supply. A pair of output receptacles are provided in the interior of the container and are electrically connected to the input receptacle for electrically connecting a pair of battery chargers in the container to the power supply. The perimeter side wall has a plurality of notches adjacent the upper edge of the perimeter side wall for extending the connecting cables of a battery charger in the interior space of the container therethrough.

Still yet another object of the present invention is to provide a new battery charger box that protects battery chargers from the weather, including rain and snow when used outdoors to recharge the batteries of vehicles such as cars, boats, and snowmobiles.

Even still another object of the present invention is to provide a new battery charger box that holds two battery charges therein for letting a user charge two batteries at the same time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
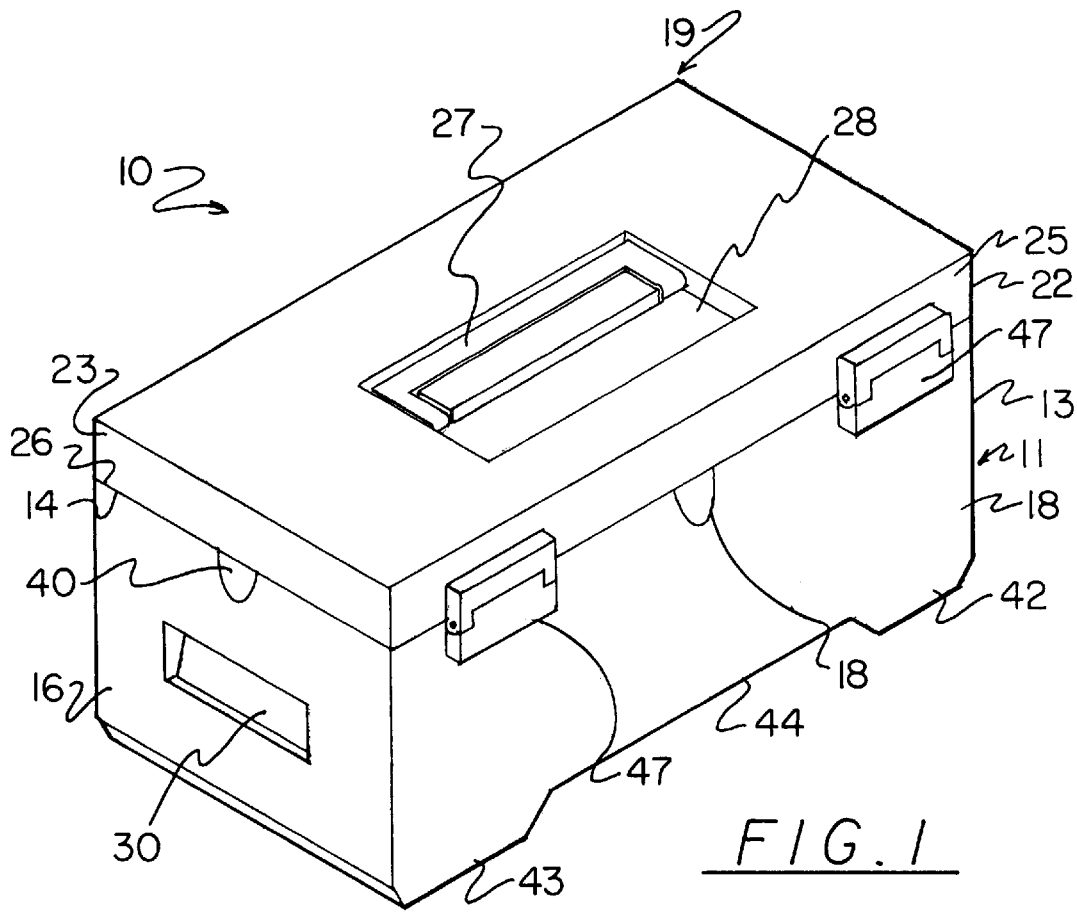
FIG. 1 is a schematic front perspective view of a new battery charger box according to the present invention.
Figure 2:
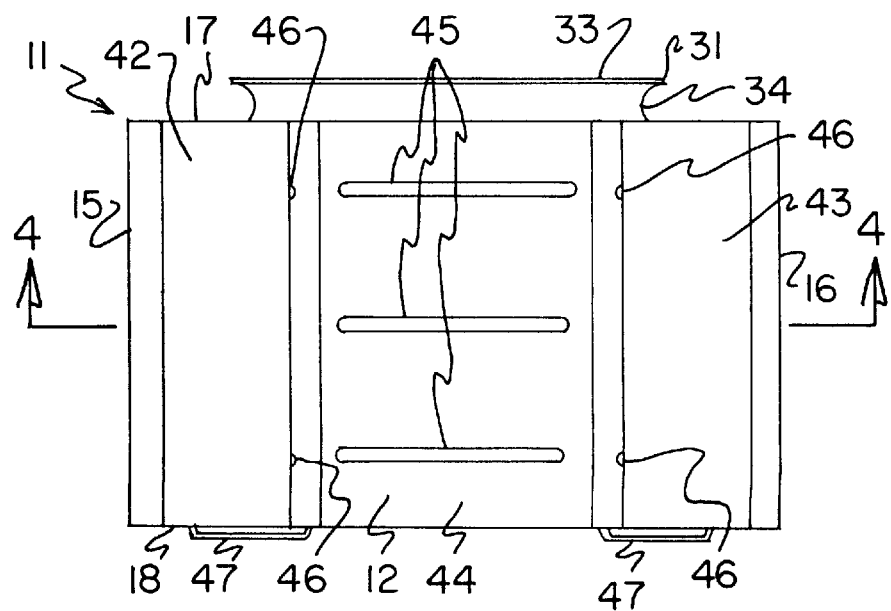
FIG. 2 is a schematic bottom side view of the present invention.
Figure 3:
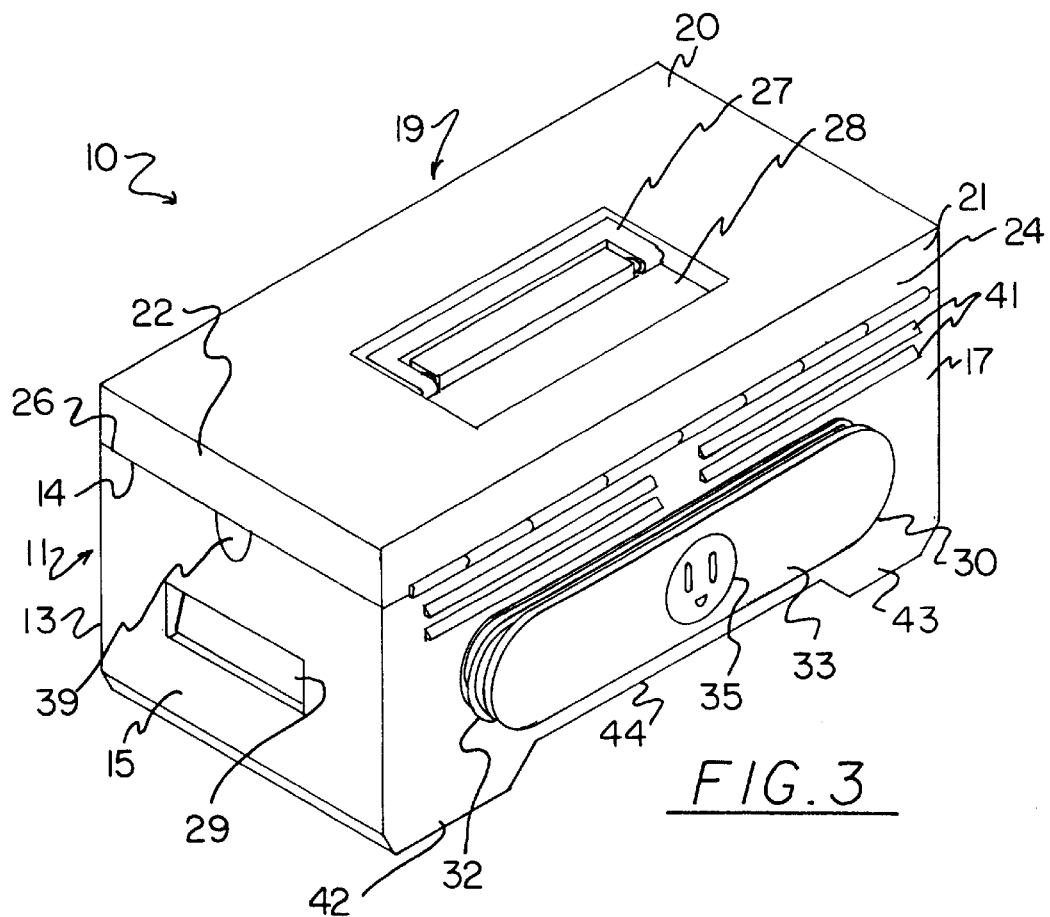
FIG. 3 is a schematic back perspective view of the present invention.

With reference now to the drawings, and in particular to FIGS. 1 through 4 thereof, a new battery charger box embodying the principles and concepts of the present invention and generally designated by the reference numeral 10 will be described.

As best illustrated in FIGS. 1 through 4, the battery charger box 10 generally comprises a container 11 with a bottom panel 12 and a perimeter side wall 13 upwardly extending around the bottom panel 12 of the container 11. A lid 19 substantially covers a top opening into the container 11 and is pivotally coupled to the perimeter side wall 13. The perimeter side wall 13 has a generally oblong cord spool 31 outwardly extending therefrom. The cord spool 31 has an input receptacle 35 for receiving an end of an electrical cord 32 connected to a power supply. A pair of output receptacles 36,37 are provided in the interior of the container 11 and are electrically connected to the input receptacle 35 for electrically connecting a pair of battery chargers 1,2 in the container 11 to the power supply. The perimeter side wall 13 has a plurality of notches 38,39,40 adjacent the upper edge 14 of the perimeter side wall 13 for extending the connecting cables 3 of a battery charger 1,2 in the interior space of the container 11 therethrough.

In closer detail, the box 10 is designed for holding a pair of rectangular battery chargers 1,2 side by side therein. Specifically, the box includes a container 11 with a bottom panel 12 and a perimeter side wall 13 upwardly extending around the perimeter of the bottom panel 12 of the container 11. The container has an interior configured for receiving a side by side pair of battery chargers 1,2 therein. The perimeter side wall 13 has an upper edge 14 defining a top opening into interior of the container 1 1. The perimeter side wall 13 has a pair of spaced apart end panels 15,16 and a pair spaced apart side panels 17,18 extending between the end panels 15,16. The end panels 15,16 of the perimeter side wall 13 generally lie in parallel planes to one another. The side panels 17,18 of the perimeter side wall 13 generally lie in parallel planes to one another and generally perpendicular to the planes of the end panels 15,16. Ideally, the panels of the perimeter side wall 13 extend generally vertically upwards from the bottom panel 12 when the bottom panel 12 is rested on a generally horizontal surface. The container 11 has a length defined between the end panels 15,16, a width defined between the side panels 17,18, and a height defined between the bottom panel 12 and the upper edge 14 of the perimeter side wall 13. In an ideal illustrative embodiment, the length of the container 11 is about 26 inches, the width of the container 11 is about 11 inches and the height of the container 11 is about 12 inches.

A lid 19 substantially covers the top opening of the container 11. Ideally, the lid 19 and the container 11 comprise a substantially water impermeable material such as a molded rigid plastic to prevent water and other moisture from penetrating into the interior of the container 11. The lid 19 has a top panel 20 and a perimeter lip 21 downwardly extending around the perimeter of the top panel 20. The perimeter lip 21 has a lower edge 26, a pair of spaced apart end portions 22,23, and a pair of spaced apart side portions 24,25 extending between the end portions 22,23. The lower edge 26 of the perimeter lip 21 is rested on the upper edge 14 of the perimeter side wall 13 when the lid 19 covers the top opening into the container 11. A first of the side portions 24 of the perimeter lip 21 is pivotally coupled to an adjacent first side panel 17 of the perimeter side wall 13. Ideally, a piano hinge pivotally couples the first side portion 24 of the perimeter lip 21 to the first side panel 17 of the perimeter side wall 13 for providing a sturdy and generally water tight pivotal coupling between the lid 19 and the container 11.

The lid 19 preferably has a carrying handle 27 pivotally coupled to the top panel 20 of the lid 19. Ideally, the top panel 20 has a generally rectangular depression 28 generally centrally positioned on the top panel 20. The carrying handle 27 of the lid 19 is located in the recess so that the carrying handle 27 can be pivoted to an orientation in the depression 28 where the handle generally lies in the same plane as the top panel 20 of the lid 19. A pair spaced apart of latches 47 releasably attach a second of the side portions 25 of the perimeter lip 21 to an adjacent second side panel 18 of the perimeter side wall 13 so that the lid 19 covers the top opening when the box is lifted by the carrying handle 27. Each of the end panels 15,16 of the perimeter side wall 13 has a handle recess 29,30 therein. The handle recess 29,30 are designed for receiving the fingers of a user therein for carrying the box. The first side panel 17 of the perimeter side wall 13 has a generally oblong cord spool 31 outwardly extending therefrom. The cord spool 31 is designed for wrapping an elongate flexible electrical cord 32 therearound to attach the flexible electrical cord 32 to the container 11. The cord spool 31 is preferably integrally molded with the first side panel 17 and has an oblong outer face 33 spaced apart from the first side panel 17 and an arcuate perimeter wall 34 between the outer face 33 and the first side panel 17 which forms a channel for receiving the flexible electrical cord 32 wrapped around the cord spool 31. The outer face 33 the cord spool 31 has an input receptacle 35 for receiving an end of the electrical cord 32 when connected to a power supply. A pair of output receptacles 36,37 are provided in the interior of the container 11 on the first side panel 17. The output receptacles 36,37 are electrically connected to the input receptacle 35. In use, each of the output receptacles 36,37 is designed for receiving an electric cord of a battery charger 1,2 in the interior of the container 11 for electrically connected the battery charger 1,2 to the power supply.

Figure 4:
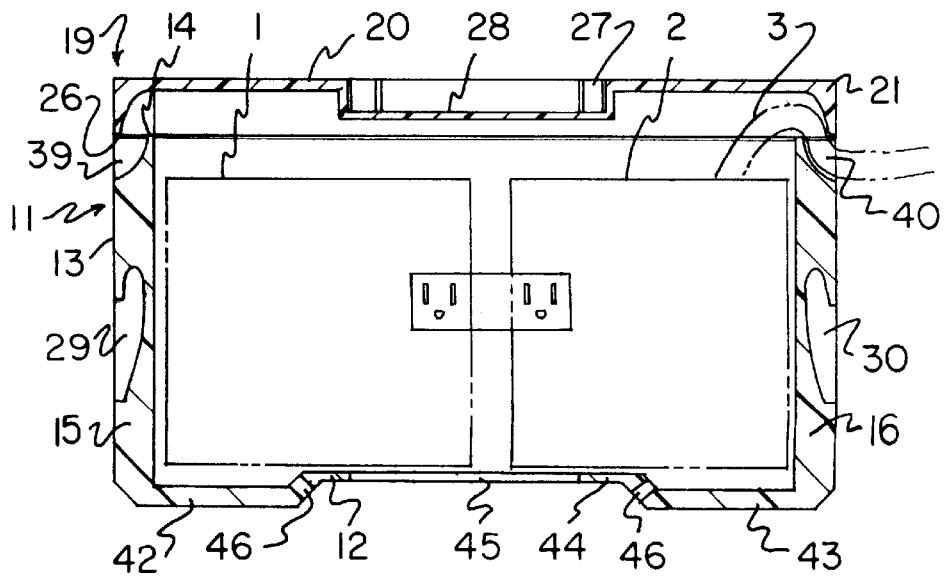
FIG. 4 is a schematic cross sectional view of the present invention taken from line 4—4 of FIG. 2.

The second side panel 18 and the end panels 15,16 each have a notch 38,39,40 adjacent the upper edge 14 of the perimeter side wall 13. Preferably, the notch 38 of the second side panel 18 is located between the pair of latches. The notches 38,39,40 of the second side panel 18 and the end panels 15,16 each is designed for extending connecting cables 3 of a battery charger 1,2 in the interior space of the container 11 therethrough. As best illustrated in FIG. 4, each of the notches 38,39,40 has a transverse concavity facing upwards and outwards from the container 11 to prevent water such as from precipitation from easily entering into the interior of the container 11 from the notches 38,39,40.

The second side panel 18 preferably has a plurality of louvered vent slits 41 therethrough. The louvered vent slits 41 are louvered for preventing precipitation and other moisture from easily entering the container 11. The louvered vent slits 41 are positioned between the upper edge 14 and the cord spool 31. Preferably, the plurality of louvered vents slits comprises four louvered vents slits arranged in a pair of spaced apart columns with one column positioned towards one end panel and the other column positioned towards the other end panel. This column arrangement of the louvered vents is designed for ensuring that each of the battery chargers 1,2 has adequate ventilation.

The bottom panel 12 has a pair downwardly extending foot portions 42,43 with one foot portion positioned adjacent one of the end panels and the other foot portion positioned adjacent the other end panel. The foot portions 42,43 are spaced apart from each other to define a raised portion 44 therebetween. The foot portions 42,43 are designed for resting on a surface such that the raised portion 44 is positioned above the surface to permit air to flow underneath the bottom panel 12. The raised portion 44 of the bottom panel 12 has a plurality of elongate lower vents 45 therethrough to permit passage of air form beneath the raised portion 44 into the interior of the container 11. Each of the foot portions 42,43 of the bottom panel 12 also has a pair of drain holes 46 therethrough on an upwardly angled region of the respective foot portion 42,43 adjacent the raised portion 44 to permit passage of moisture and fluid out of the interior of the container 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A box for holding a pair of battery chargers side by side therein, said box comprising:

a container having a bottom panel, a perimeter side wall upwardly extending around said bottom panel of said container, and an interior configured for receiving a pair of battery chargers therein, said perimeter side wall having an upper edge defining a top opening into interior of said container;

said perimeter side wall having a pair of spaced apart end panels and a pair spaced apart side panels extending between said end panels;

a lid substantially covering said top opening of said container, said lid having a top panel and a perimeter lip downwardly extending around said top panel;

said perimeter lip being pivotally coupled to a first side panel of said perimeter side wall;

said first side panel of said perimeter side wall having a generally oblong cord spool outwardly extending therefrom, said cord spool being adapted for wrapping an elongate flexible electrical cord therearound;

said cord spool having an input receptacle for receiving an end of an electrical cord connected to a power supply;

a pair of output receptacles being provided in said interior of said container on said first side panel, said output receptacles being electrically connected to said input receptacle, each of said output receptacles being adapted for receiving an electric cord of a battery charger in said interior of said container for electrically connected the battery charger to the power supply; and said perimeter side wall having a plurality of notches adjacent said upper edge of said perimeter side wall, said notches being adapted for extending connecting cables of a battery charger in said interior space of said container therethrough.

2. The box of claim 1, wherein a piano hinge pivotally couples a first side portion of said perimeter lip to a first side panel of said perimeter side wall.

3. The box of claim 1, wherein said lid has a carrying handle pivotally coupled to said top panel of said lid.

4. The box of claim 3, wherein said top panel has a generally rectangular depression generally centrally positioned on said top panel, said carrying handle of said lid being located in said recess.

5. The box of claim 1, wherein each of said end panels of said perimeter side wall has a handle recess therein.

6. The box of claim 1, wherein one of said side panels has a plurality of louvered vent slits therethrough.

7. The box of claim 1, wherein said bottom panel has a pair downwardly extending foot portions, one of said foot portions being positioned adjacent one of said end panels, another of said foot portions being positioned adjacent another of said end panels, said foot portions being spaced apart from each other to define a raised portion of said bottom panel therebetween.

8. The box of claim 7, wherein said raised portion of said bottom panel has a plurality of elongate lower vents therethrough.

9. The box of claim 7, wherein each of said foot portions of said bottom panel has a pair of drain holes therethrough adjacent said raised portion.

10. A box for holding a pair of battery chargers side by side therein, said box comprising:

a container having a bottom panel, a perimeter side wall upwardly extending around said bottom panel of said container, and an interior configured for receiving a pair of battery chargers therein, said perimeter side wall having an upper edge defining a top opening into interior of said container;

said perimeter side wall having a pair of spaced apart end panels and a pair spaced apart side panels extending between said end panels;

said end panels of said perimeter side wall generally lying in parallel planes to one another, said side panels of said perimeter side wall generally lying in parallel planes to one another and generally perpendicular to said planes of said end panels;

said container having a length defined between said end panels, a width defined between said side panels, and a height defined between said bottom panel and said upper edge of said perimeter side wall;

a lid substantially covering said top opening of said container, said lid having a top panel and a perimeter lip downwardly extending around said top panel;

said perimeter lip having a lower edge, a pair of spaced apart end portions, and a pair of spaced apart side portions extending between said end portions;

said lower edge of said perimeter lip being rested on said upper edge of said perimeter side wall when said lid covers said top opening into said container;

a first of said side portions of said perimeter lip being pivotally coupled to an adjacent first side panel of said perimeter side wall, wherein a piano hinge pivotally couples said first side portion of said perimeter lip to said first side panel of said perimeter side wall;

said lid having a carrying handle pivotally coupled to said top panel of said lid, said top panel having a generally rectangular depression generally centrally positioned on said top panel, said carrying handle of said lid being located in said recess;

a pair spaced apart of latches releasably attaching a second of said side portions of said perimeter lip to an adjacent second side panel of said perimeter side wall;

each of said end panels of said perimeter side wall having a handle recess therein;

said first side panel of said perimeter side wall having a generally oblong cord spool outwardly extending therefrom, said cord spool being adapted for wrapping an elongate flexible electrical cord therearound;

said cord spool and having an oblong outer face spaced apart from said first side panel and an arcuate perimeter wall between the outer face and the first side panel forming a channel for receiving the flexible electrical cord wrapped around the cord spool;

said outer face said cord spool having an input receptacle for receiving an end of an electrical cord connected to a power supply;

a pair of output receptacles being provided in said interior of said container on said first side panel, said output receptacles being electrically connected to said input receptacle, each of said output receptacles being adapted for receiving an electric cord of a battery charger in said interior of said container for electrically connected the battery charger to the power supply;

said second side panel and said end panels each having a notch adjacent said upper edge of said perimeter side wall, said notch of said second side panel being located between said pair of latches, said notches of said second side panel and said end panels each being adapted for extending connecting cables of a battery charger in said interior space of said container therethrough;

said second side panel having a plurality of louvered vent slits therethrough, said louvered vent slits being positioned between said upper edge and said cord spool, wherein said plurality of louvered vents slits comprises four louvered vents slits arranged in a pair of spaced apart columns, one of said columns being positioned towards one end panel, another of said columns being positioned towards another end panel;

said bottom panel having a pair downwardly extending foot portions, one of said foot portions being positioned adjacent one of said end panels, another of said foot portions being positioned adjacent another of said end panels, said foot portions being spaced apart from each other to define a raised portion of said bottom panel therebetween;

said raised portion of said bottom panel having a plurality of elongate lower vents therethrough; and each of said foot portions of said bottom panel having a pair of drain holes therethrough adjacent said raised portion to permit passage of moisture and fluid out of said interior of said container.

* * * * *